(12) United States Patent
Tanaka et al.

(10) Patent No.: US 6,789,173 B1
(45) Date of Patent: Sep. 7, 2004

(54) NODE CONTROLLER FOR PERFORMING CACHE COHERENCE CONTROL AND MEMORY-SHARED MULTIPROCESSOR SYSTEM

(75) Inventors: Tsuyoshi Tanaka, Kokubunji (JP); Hideya Akashi, Kunitachi (JP); Yuji Tsushima, Kokubunji (JP); Keitaro Uehara, Kokubunji (JP); Naoki Hamanaka, Tokyo (JP); Toru Shonai, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 647 days.

(21) Appl. No.: 09/585,390

(22) Filed: Jun. 2, 2000

(30) Foreign Application Priority Data

Jun. 3, 1999 (JP) .......................................... 11-156560

(51) Int. Cl.[7] .............................................. G06F 12/00
(52) U.S. Cl. ........................ 711/147; 711/141; 370/352
(58) Field of Search ................................. 370/352, 389; 711/202, 147, 141; 712/12

(56) References Cited

U.S. PATENT DOCUMENTS

| | | | | |
|---|---|---|---|---|
| 5,165,038 A | * | 11/1992 | Beard et al. | ................. 711/147 |
| 5,560,027 A | * | 9/1996 | Watson et al. | ................. 712/12 |
| 5,933,857 A | * | 8/1999 | Brewer et al. | .............. 711/202 |

* cited by examiner

*Primary Examiner*—Gary Portka
*Assistant Examiner*—Thang Ho
(74) *Attorney, Agent, or Firm*—Mattingly Stanger & Malur, P.C.

(57) ABSTRACT

In a multiprocessor system of a main memory shared type having a plurality of nodes connected each other through signal lines; each of the plurality of nodes includes CPUs having caches therein, a main memory, and a node controller for performing communication control between the CPUs, main memory and ones of the nodes other than its own node. The node controller has a communication controller for controlling communication interface between the plurality of nodes, a crossbar for determining a processing sequence of memory access issued from at least one of the plurality of nodes to be directed to the main memories of the plurality of nodes, and crossbar controller for making valid or invalid the crossbar.

20 Claims, 15 Drawing Sheets

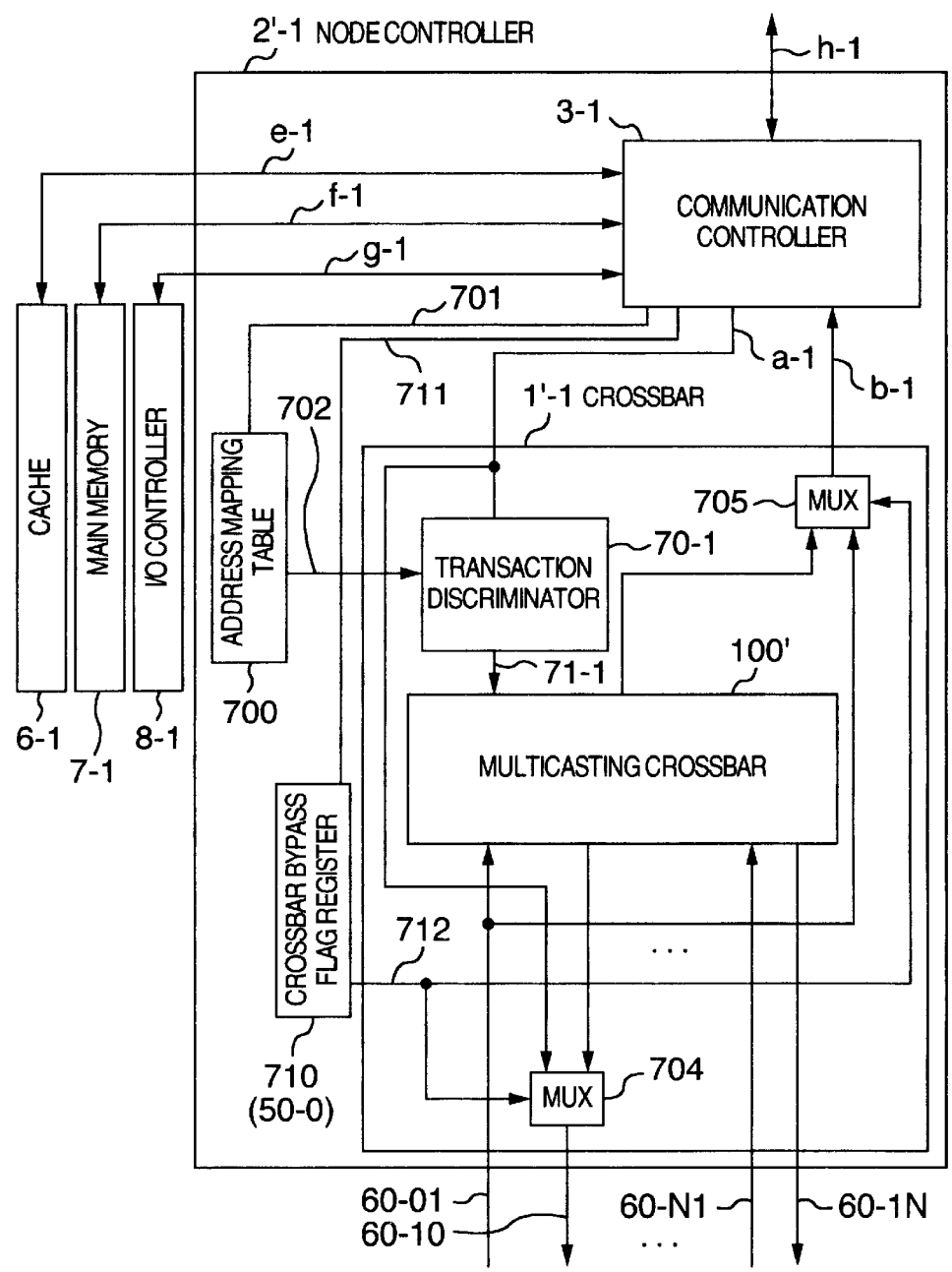

FIG. 13

| | | ADDRESS SPACE REQUESTED BY TRANSACTION ||
| | | MAIN MEMORY OF OWN NODE | MAIN MEMORY OF ANOTHER NODE |
|---|---|---|---|
| BEFORE ARBITRATION ARB=0 | TRANSACTION ISSUANCE ORIGINATOR IS OWN NODE | TRANSFER TO TRANSFER OBJECTIVE NODE/UPDATE TO ARB=1 (STEP 1004) | TRANSFER TO NODE TO WHICH REQUESTING ADDRESS IS ALLOCATED; NO UPDATING OF ARB IS CARRIED OUT (STEP 1005) |
| | TRANSACTION ISSUANCE ORIGINATOR IS OTHER NODE | | |
| AFTER ARBITRATION ARB=1 | TRANSACTION ISSUANCE ORIGINATOR IS AN ARBITRARY NODE | TRANSFER TO COMMUNICATION CONTROLLER OF OWN NODE (EVENTUALLY TO CPU AND CACHE) ||

FIG. 15

| | | ADDRESS SPACE REQUESTED BY TRANSACTION | |
|---|---|---|---|
| | | MAIN MEMORY OF OWN NODE | MAIN MEMORY OF ANOTHER NODE |
| BEFORE ARBITRATION ARB=0 | TRANSACTION ISSUANCE ORIGINATOR IS OWN NODE | TRANSFER TO TRANSFER OBJECTIVE NODE/UPDATE TO ARB=1 (STEP 1004) | TRANSFER TO ALL NODES OTHER THAN OWN NODE; NO UPDATING OF ARB IS CARRIED OUT (STEP 2005) |
| | TRANSACTION ISSUANCE ORIGINATOR IS OTHER NODE | | REQUEST IS DISCARDED |
| AFTER ARBITRATION ARB=1 | TRANSACTION ISSUANCE ORIGINATOR IS AN ARBITRARY NODE | TRANSFER TO COMMUNICATION CONTROLLER OF OWN NODE (EVENTUALLY TO CPU AND CACHE) | |

NODE CONTROLLER FOR PERFORMING CACHE COHERENCE CONTROL AND MEMORY-SHARED MULTIPROCESSOR SYSTEM

BACKGROUND OF THE INVENTION

The present invention relates to a multiprocessor system in which processors share a main memory and which uses such a snoop scheme as to distribute an address of a requesting cache line to all the processors for coherency control and more particular, to a multiprocessor including nodes each of which has CPUs, a main memory and a cache memory unit and which has a structure capable of being used as a part common to both small and large systems, and also to a node controller in each node.

A prior art system, in which nodes each having CPUs and a main memory mounted on an identical board are commonly used to both small and large multiprocessor systems, is described in James Laudon, et al., System Overview of the SGI Origin 200/2000 Product Line. Proceeding of the 47th IEEE COMPUTER SOCIETY INTERNATIONAL CONFERENCE, pp. 150–156, February, 1997.

The origin 200/200 includes one or more nodes, each node having two CPUs, a main memory and a hub chip.

The hub chip has a communication interface controller with the CPUs, a communication interface controller with the main memory and directory, an external I/O interface controller, and a crossbar for coupling these interface controllers.

The Origin 200 corresponding to a small multiprocessor system includes usually one sheet of node board and in some cases, includes two sheets of node boards directly connected by an external I/O interface from the hub chip. The Origin 2000 corresponding to a large multiprocessor system includes two or more node boards mounted on the crossbar and connected by a rooter board. The Origin 200 and Origin 2000 will be referred to merely as the Origin without drawing a distinction therebetween, in the following description.

As in the Origin, various types of systems can be formed using a plurality of identical nodes regardless of the system size or scale. This is an effective means of reducing its development costs and shortening a development period of time.

The Origin also performs directory type cache coherency control with use of a (cache-coherent non-uniform memory access) ccNUMA type multiprocessor.

This control is already detailed in James laudon, et al, The SGI Origin: A ccNUMA Highly Scalable Server, Proceeding of $24^{th}$ Annual Symposium on Computer Architecture, pp. 241–251, June, 1997.

The memory access of the Origin is carried out usually in the following manner. A memory access request issued from a CPU is transferred to a node having a main memory having a requesting address present therein to search the node for a directory. A directory, which is provided for each cache line corresponding to the requested address, records therein the directory is transferred to the cache memory of which node in what state.

As a result of searching for the directory, data read out from the cache memory of the found node or from the main memory is transferred to the CPU as the request issuance originator.

A prior art crossbar having an arbiter for determining a processing sequence of a memory access request for cache coherency control is shown in U.S. Pat. No. 6,011,791. It is generally already known that a crossbar performs data parallel transfer and is higher in throughput performance than a bus.

However, there is a possibility that the memory access sequence may be partially reversed to disturb the cache coherency.

The cache coherency is maintained by the directory system in the Origin; whereas, the cache coherency is controlled by uniquely sequencing memory access requests issued from CPUs in an arbiter which performs logically unique operation within the crossbar in such a multiprocessor system as shown in U.S. Pat. No. 6,011,791.

The sequenced requests are transmitted to the CPUs, main memory and I/O controller through a selector within the crossbar. A system for realizing snooping cache by providing the crossbar with a function of sequencing the memory access requests to broadcast the memory access requests to all the CPUs in this way, will be referred to as the multicasting system, hereinafter.

Further, a crossbar having a function of sequencing memory access requests to realize the multicasting system will be referred to as the multicasting crossbar, hereinafter.

SUMMARY OF THE INVENTION

However, the multiprocessor system disclosed in the U.S. Pat. No. 6,011,791 is not arranged to be able to form a small system by using a small number of nodes used only in a large system and directly connecting these nodes as in the Origin.

In the case of the multiprocessor system for performing the aforementioned directory type cache coherency control, in general, there is a problem that the frequency of transmission between LSIs is increased by the frequency of directory reference, thus increasing the memory latency.

An increase in the amount or size of main memory also causes an increase in the amount of directory. Accordingly a large capacity of main memory to be mounted requires a large capacity of directory memory, thus disadvantageously increasing involving high costs.

It is therefore an object of the present invention to provide a node controller which can eliminate the above problems in the prior art and also to provide a multiprocessor system of a main-memory shared type using such a node controller.

Another object of the present invention is to provide a node controller which can use nodes common to both a small multiprocessor system having a small number of nodes and a large multiprocessor system having a large number of nodes using a crossbar, and also to provide a multiprocessor system of a main memory shared type which uses such a node controller.

A further object of the present invention is to provide a node controller which can reduce development costs by using nodes common to both a small system having a small number of nodes and a large system having a large number of nodes as in the aforementioned Origin, and also to provide a multiprocessor system of a main memory shared type using such a node controller.

Yet another object of the present invention is to provide a node controller which allows a plurality of nodes to be directly connected to form a small system and can omit an external crossbar, and also to provide a multiprocessor system of a main memory shared type using such a node controller.

A still further object of the present invention is to provide a node controller which can reduce an increase in memory latency caused by an overhead of directory reference by employing a cache coherency control system not using directory and can avoid increase of costs of devices other than a main memory even when the size of the main memory is increased, and also to provide a multiprocessor system of a main memory shared type using such a node controller.

In accordance with an aspect of the present invention, in order to attain the above objects, there is provided a multiprocessor system of a main memory shared type having a plurality of nodes mutually connected by signal lines, each of the plurality of nodes including:

a CPU having a cache memory;

a main memory; and a node controller for performing communication control between the CPU, main memory and the other nodes than its own node, the node controller having:

a communication controller for controlling communication interface between the plurality of nodes;

a crossbar for determining a processing sequence of memory access requests to the main memories in the plurality of nodes issued from at least one of the plurality of nodes; and a crossbar controller means for validating or invalidating the crossbar.

With such an arrangement, nodes having common structures can be used in both a small multiprocessor system having a small number of nodes and a large multiprocessor system having a large number of nodes, thus eliminating the need for developing nodes differently for the small and large multiprocessor systems and reducing its development costs. In this case, the crossbar for determining the processing sequence of memory access requests is only required to be validated, while the crossbars for not determining the sequence are only required to be invalidated. Further, by using a cache coherence control system not using directory, an increase in memory latency caused by an overhead of directory reference can be reduced and an increase in costs of components other than the main memory can be prevented even when the size of the main memory is increased.

In an example of the present invention, the crossbar control means in one of the plurality of nodes validates the crossbar of the one node while the crossbar control means in the other remaining nodes invalidate the crossbars of the other remaining nodes, whereby the crossbar of the one node determines a processing sequence of memory access requests to the main memories in the plurality of nodes issued from the plurality of nodes.

In another example of the present invention, the node controller has:

a communication controller for controlling communication interface between a plurality of nodes;

a crossbar for determining a processing sequence of ones of memory access requests to the main memories in the plurality of nodes issued from at least one of the plurality of nodes to be directed to the main memory of its own node having the node controller therein; and a crossbar controller means for validating or invalidating the crossbar.

In a further example of the present invention, the crossbar has:

means for judging whether or not a memory access request issued from at least one of a plurality of nodes is one to be directed to the main memory within any of the plurality of nodes;

means for determining a processing sequence of the memory access requests judged by the judging means that the memory access requests are ones to be directed to the main memory in its own node having the crossbar therein; and means for transferring only to the other one node the memory access requests judged by the judging means that the memory access requests are ones to be directed to the main memory of the other one node other than the own node, and the crossbar controller means in each of the plurality of nodes validates the crossbar of own node having the crossbar controller means therein.

In yet another example of the present invention, the crossbar has:

means for judging whether or not a memory access request issued from at least one of the plurality of nodes is one to be directed to the main memory in own one of the plurality of nodes having the crossbar therein;

means for determining a processing sequence of the memory access requests judged by the judging means that the memory access request are ones to be directed to the main memory in the own node; and means for transferring to the all nodes other than the own node having crossbar therein the memory access requests judged by the judging means that the memory access requests are not ones to be directed to the main memory in the own node, and the crossbar controller means in each of the plurality of nodes validates the crossbar of its own node having the crossbar controller means therein.

In accordance with another aspect of the present invention, there is provided a multiprocessor system of a main memory shared type having a plurality of nodes mutually connected by signal lines, each of the plurality of nodes including:

a CPU having a cache memory;

a main memory;

a node controller for performing communication control between the CPU, main memory and the other nodes than its own node;

the node controller having:

a communication controller for controlling communication interface between the plurality of nodes;

a crossbar for determining a processing sequence of memory access requests issued from at least one of the plurality of nodes to be directed to the main memory of its own node having the crossbar therein; and a crossbar controller means for validating or invalidating the crossbar, the multiprocessor system of the main memory shared type further including an external crossbar connected to each of the plurality of nodes for determining a processing sequence of memory access requests issued from at least one of the plurality of nodes to be directed to the main memories in the plurality of nodes.

In a large multiprocessor system, therefore, nodes for use in a small multiprocessor system and a plurality of nodes having the same structure as these nodes are connected to the external crossbar so that the crossbar can determine a processing sequence of memory access requests issued from all the nodes, In this case, it is only required to invalidate the crossbars in all the nodes.

In accordance with a further aspect of the present invention, there is provided a node controller which has:

a crossbar for determining a processing sequence of memory access requests issued from its own node having the crossbar therein and from at least one of the other nodes to be directed to the main memory of at least the own node; and means for validating or invalidating the crossbar.

When the node controller having such a structure is used, the node controllers having the structure common to both small and large multiprocessor systems can be employed, thus eliminating the need for developing the node controllers differently for the small and large multiprocessor systems and leading to reduction of development costs. That is, a small multiprocessor system is formed by directly connecting a plurality of nodes each having such a node controller and eliminating the need for provision of an external crossbar. A large multiprocessor system is formed by connecting a plurality of nodes each having such a node controller to an external crossbar to cause the external crossbar to determine a processing sequence of memory access requests issued from all the nodes. In this case, it is only required to invalidate the crossbars within all the nodes.

BRIEF DESCRIPTION OF THE DRAWINGS

FIG. 12 shows an exemplary structure of a node controller in one of the other nodes in the second embodiment;

FIG. 13 is a table describing a part of exemplary request control operations of the multicasting crossbar in the second embodiment;

FIG. 15 is a table describing a part of the request control operations of the multicasting crossbar in the third embodiment.

DESCRIPTION OF THE EMBODIMENTS

Figure 1:
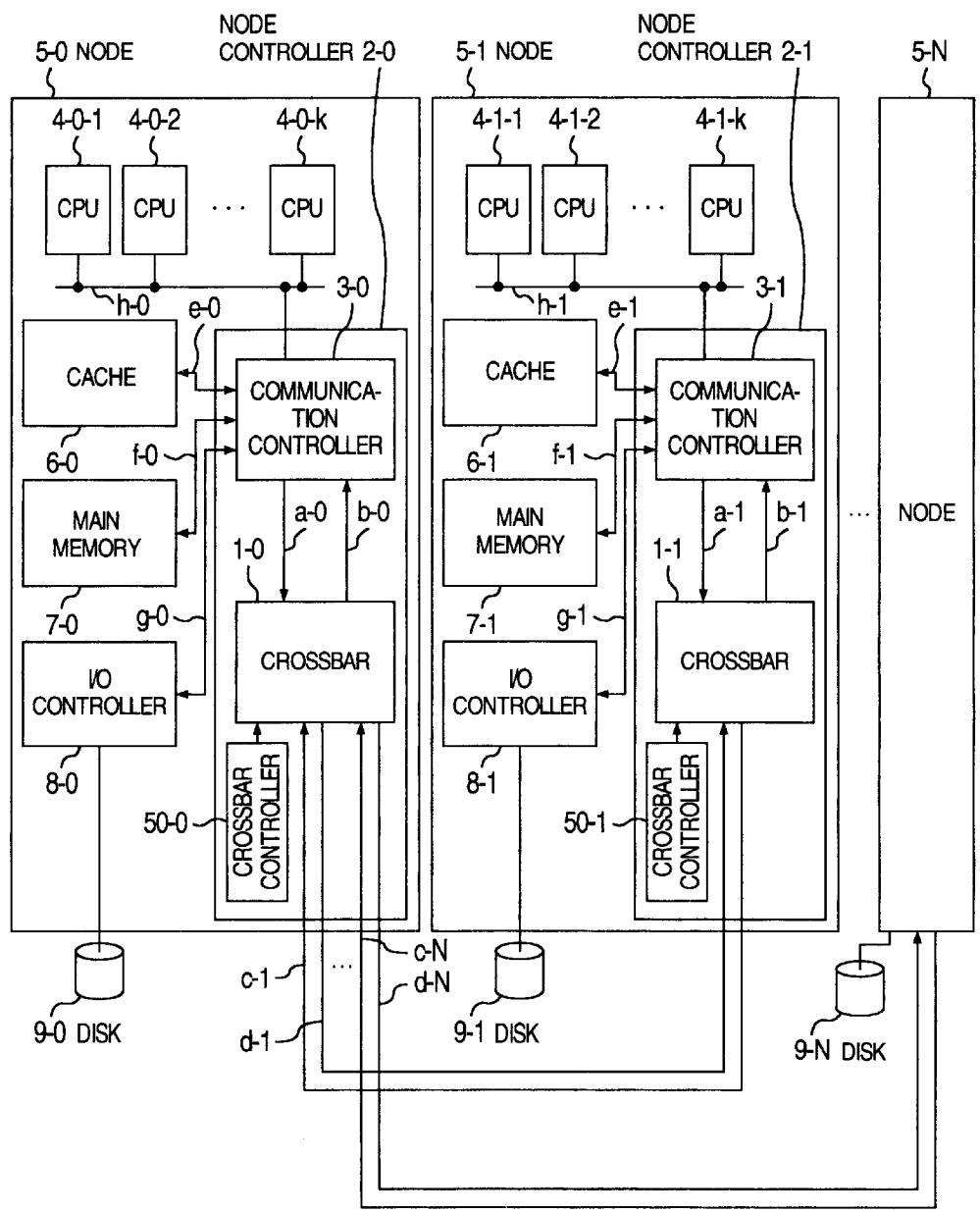
FIG. 1 schematically shows an exemplary arrangement of a multiprocessor system of a main memory shared type in accordance with a first embodiment of the present invention.

Several embodiments of a node controller and a multiprocessor system of a main memory shared type in accordance with the present invention will be explained in detail with reference to attached drawings. In the embodiments, parts having substantially the same functions are denoted by the same reference numerals or symbols.

First Embodiment

Brief Explanation of System Arrangement

FIG. 1 shows a block diagram of an exemplary entire arrangement of a multiprocessor system of a main memory shared type in accordance with a first embodiment of the present invention.

The present embodiment is arranged so that a processing sequence of memory access requests to main memories issued from at least one of a plurality of nodes is determined by a single crossbar within each of the plurality of nodes, and all the crossbars within the other nodes are invalidated (that is, are put in their non-operational state not to perform deciding operation of the processing sequence of the memory access request).

In FIG. 1, reference symbols 5-i ($0 \leq i \leq N$, N being a natural number of 1 or more) denote (N+1) nodes which are connected by (N+1) signal lines c-i and d-i.

Explanation will next be made as to the structure of the nodes 5-i. The nodes have all an identical structure.

The node 5-i includes k CPUs 4-i-j ($0 \leq i \leq k$, k being a natural number of 1 or more), a cache 6-i, at least one main memory 7-i, an I/O controller 8-i and a node controller 2-i. The node controller 2-i has a communication controller 3-i and a crossbar 1-i.

Each of the CPUs 4-i-j (4-i-0 to 4-i-k) has a processor cache (not shown) of a write-back type. The CPUs are connected each other by processor buses h-i.

The cache 6-i has a cache memory (not shown) of a write-back type and a cache memory controller (not shown. The cache memory of the cache 6-i is shared by all the CPUs 4-i-j of the nodes 5-i. In a memory hierarchical or tree structure of the multiprocessor system of the present embodiment, the cache is located between the processor cache and main memory.

The main memory 7-i forms a part of a main memory space shared by all the nodes 5-i.

The I/O controller 8-i is connected to a plurality of I/O devices (only one of which is illustrated) such as a disc 9-i. Also connected to the I/O controller is another I/O device such as a network (not shown).

The communication controller 3-i is connected to the CPUs 4-i-j, cache 6-i, main memory 7-i and I/O controller 8-i respectively by the processor bus h-i and signal lines e-i, f-i and g-i.

Further the communication controller 3-i is connected to the crossbar 1-i by signal lines a-i and b-i.

The communication controller 3-i functions to perform communication control between the respective constituent elements within the node.

More specifically, the communication controller 3-i, for example, performs communication protocol control or format conversion of communication data to transfer to the cache 6-i a memory access request transferred to the processor bus h-i from the CPU 4-i-j or to transfer a memory access request issued to another node via the crossbar.

The crossbar 1-i is connected to the communication controller 3-i within its own node (having the crossbar 1-i therein) by the signal lines a-i and b-i and also connected to other nodes by the signal lines c-i and d-i.

In the present invention, nodes having an identical structure can be used commonly to both small- and large-arrangement multiprocessor systems.

In this specification, a multiprocessor system having a small number of CPUs or nodes is called a small multiprocessor system; while a multiprocessor system having a large number of nodes is called a large multiprocessor system.

There is no clear distinction in the number of nodes between the large and small systems, and the distinction depends on the number of sets of signal lines c-i and d-i provided to the crossbar 1-i for connection with other nodes for convenience of mounting.

Figure 2:
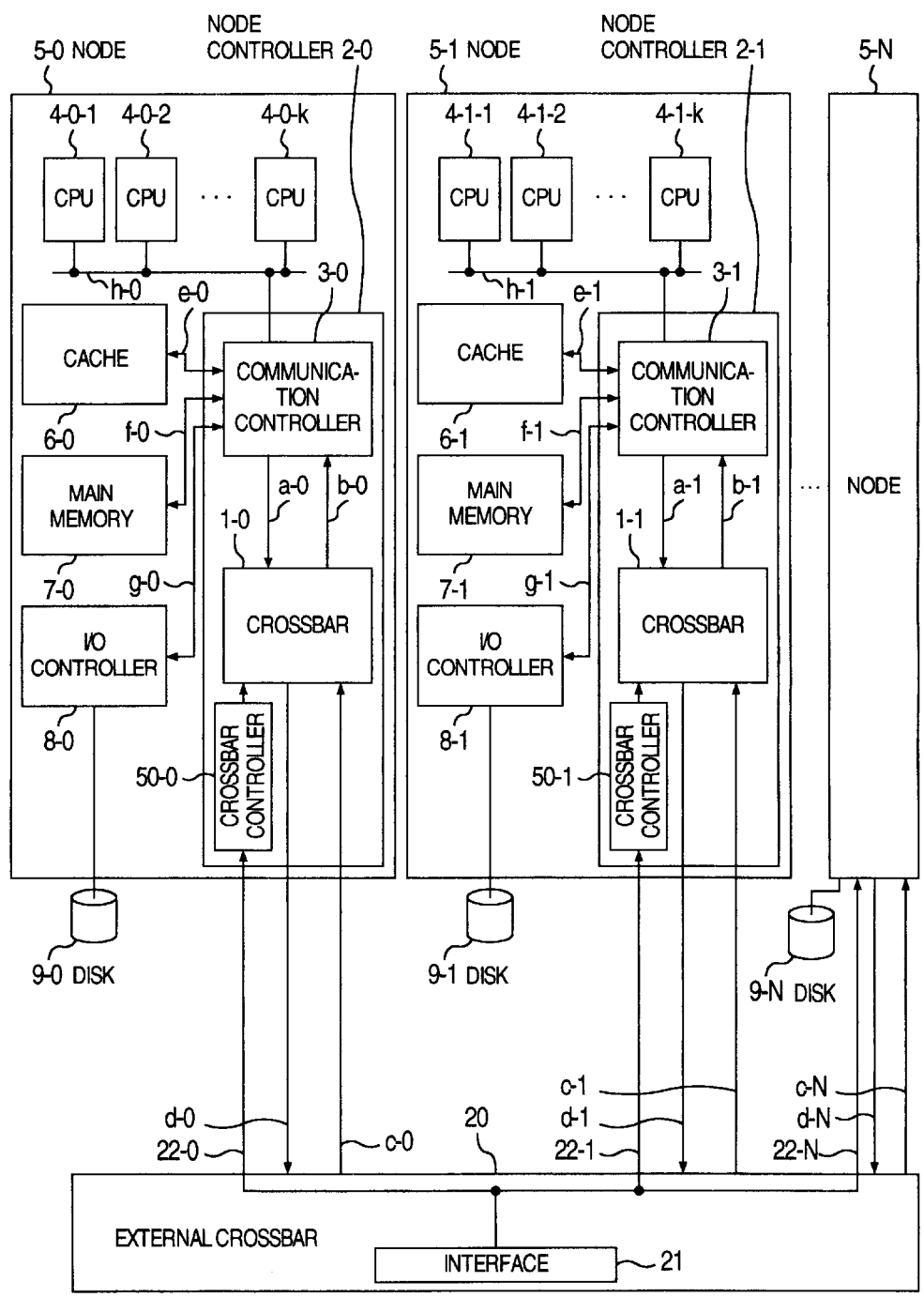
FIG. 2 shows an exemplary entire arrangement of a large multiprocessor system in which nodes in the first embodiment are connected to an external crossbar.

FIG. 1 shows an arrangement of a small system and FIG. 2 shows an arrangement of a large system.

In the arrangement of the large-arrangement system, a plurality of nodes 5-i having the same structure as those in FIG. 1 are connected to an external crossbar 20 provided outside of the nodes 5-i by signal lines c-0, . . . , and c-N, and d-0, . . . , and d-N.

The external crossbar 20 is substantially the same as that described in the aforementioned U.S. Pat. No. 6,011,791.

Figure 3:
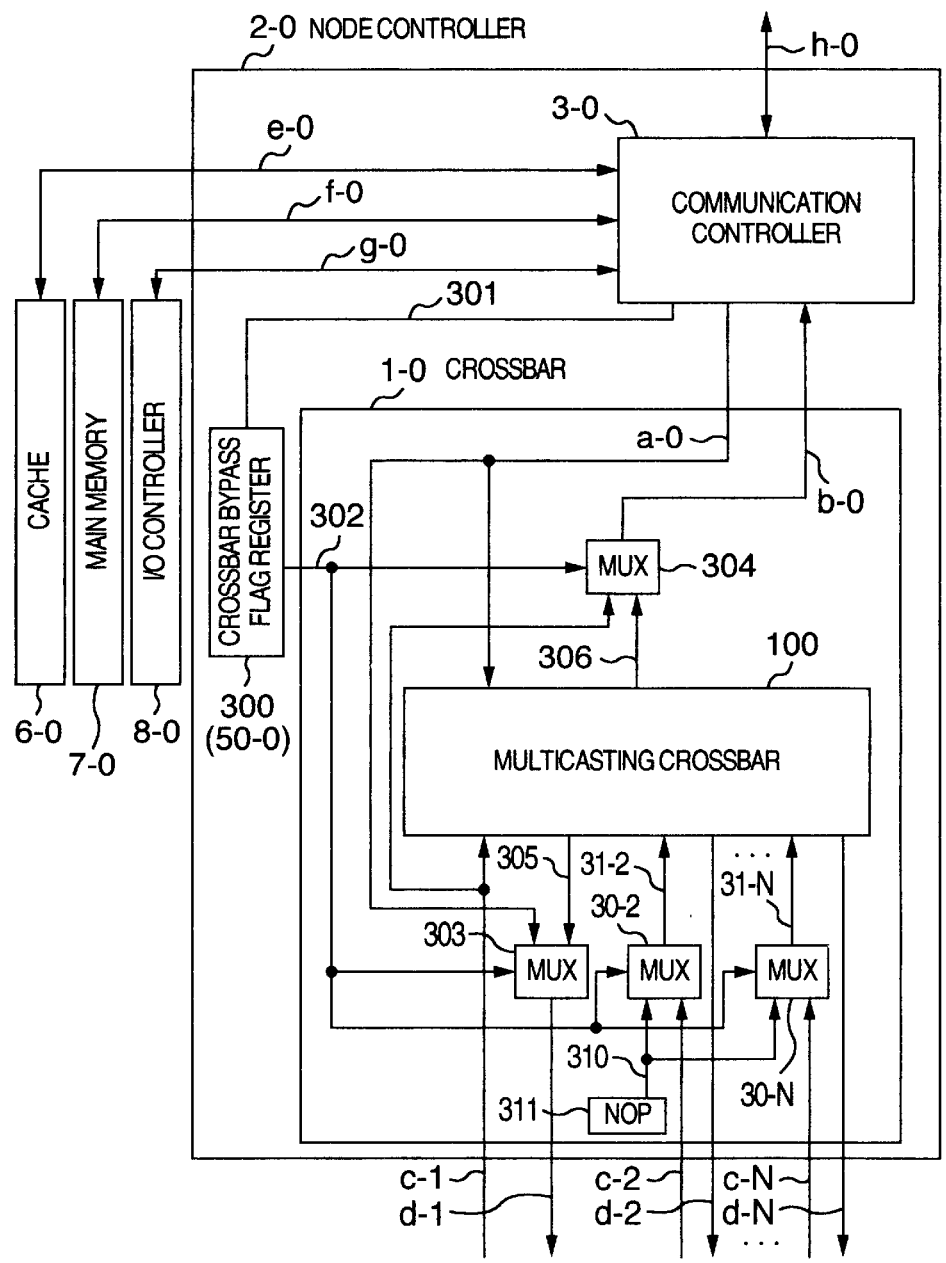
FIG. 3 shows an exemplary structure of a node controller in the first embodiment.

FIG. 3 shows an exemplary structure of an interior of a node controller 2-0.

Since all the nodes 5-i have the same structure, explanation will be made as to the node 5-0 in FIG. 1 as an example by referring to FIG. 3.

The node controller 2-0 has a crossbar controller 50-i (50-0 in the illustrated example), in addition to the communication controller 3-0 and crossbar 1-0 already explained above.

The crossbar controller 50-0 can set a mode to validate its own multicasting crossbar 100 belonging to its own node (i.e., operational mode to decide a processing sequence of memory access requests) and also can set a mode to invalidate the multicasting crossbar 100 (i.e., non-operational mode not to decide the processing sequence of memory access requests). In the illustrated example, the crossbar controller 50-0 is a crossbar bypass flag register 300 such as a mode register which can set these modes.

The crossbar 1-0 has the multicasting crossbar 100 and multiplexers 303, 304 and 30-v (2≦v≦N).

In the case where the number of nodes is 2, however, the multiplexers 30-2, . . . , and 30-N, signal lines 31-2, . . . , and 31-N, c-2, . . . , and c-N, d-2, . . . , and d-N are not used.

The crossbar bypass flag register 300 is a flag register for storing a crossbar bypass flag of, e.g., one bit, which register is connected to the communication controller 3-0 by the signal line 301 and also connected to the multiplexers 303, 304 and 30-v (2≦v≦N) by the signal line 302.

The multiplexer 304 selects either one of a signal on the signal line 306 from the own multicasting crossbar 100 and a signal on the signal line c-i from another node, on the basis of a signal of the signal line 302 from the crossbar bypass flag register 300, and then outputs the signal of the selected signal line onto the signal line b-0.

The multiplexer 303 selects either one of a signal on the signal line 305 from the multicasting crossbar 100 and a signal on the signal line a-0 from the communication controller 3-0, on the basis of a signal of the signal line 302 from the crossbar bypass flag register 300, and then outputs the signal of the selected signal line onto the signal line d-1.

When the crossbar bypass flag register 300 has a flag set value of, e.g., 1, the multiplexers 303 and 304 both select the signal lines a-0 and c-1 respectively to bypass or invalidate the multicasting crossbar 100.

When the crossbar bypass flag register 300 has a flag set value of, e.g., 0, the multiplexers 303 and 304 both select the signal lines 305 and 306 respectively.

The multiplexer 30-v, when the crossbar bypass flag register has a flag set value of 0, selects the signal line c-v from another node to connect the node to the multicasting crossbar 100, that is, to validate the multicasting crossbar 100.

When the crossbar bypass flag register 300 has a flag set value of 1, the multiplexer 30-v selects a signal line 310 and transfers to the multiplexer 30-v an NOP signal 311 indicative of no presence of a transaction.

For example, when an all-zero signal indicates absence of a transaction, the NOP signal is set at a fixed all-zero value at the time of design.

In this way, when the crossbar bypass flag register 300 has a set value of 0, this is called "the multicasting crossbar 100 is valid"; whereas, when the register 300 has a set value of 1, this is called "the multicasting crossbar 100 is invalid".

When the multicasting crossbar 100 is invalid in FIG. 3, the signal lines a-0 and b-0 of the communication controller 3-0 are directly used as an input and output of the node. In the multiprocessor system of the present embodiment, the multicasting crossbar 100 is made valid only in a single node and the multicasting crossbars 100 in the other all nodes are all made invalid. More specifically, in the embodiment of FIG. 1, the multicasting crossbar 100 is made valid only in the node 5-0 so that the node 5-0 is connected to other nodes 5-1 to 5-N through the signal lines c-i and d-i.

In such a large arrangement system using the external crossbar 20 as shown in FIG. 2, the multicasting crossbars 100 as shown in FIG. 3 in all the nodes are all made invalid.

The crossbar bypass flag registers 300 shown in FIG. 3 are provided as a map register located in an address space and set so that, at the time of starting the system, only the crossbar bypass flag register in one node is set at 0 and the crossbar bypass flag registers in the other nodes are all set at 1.

Figure 4:
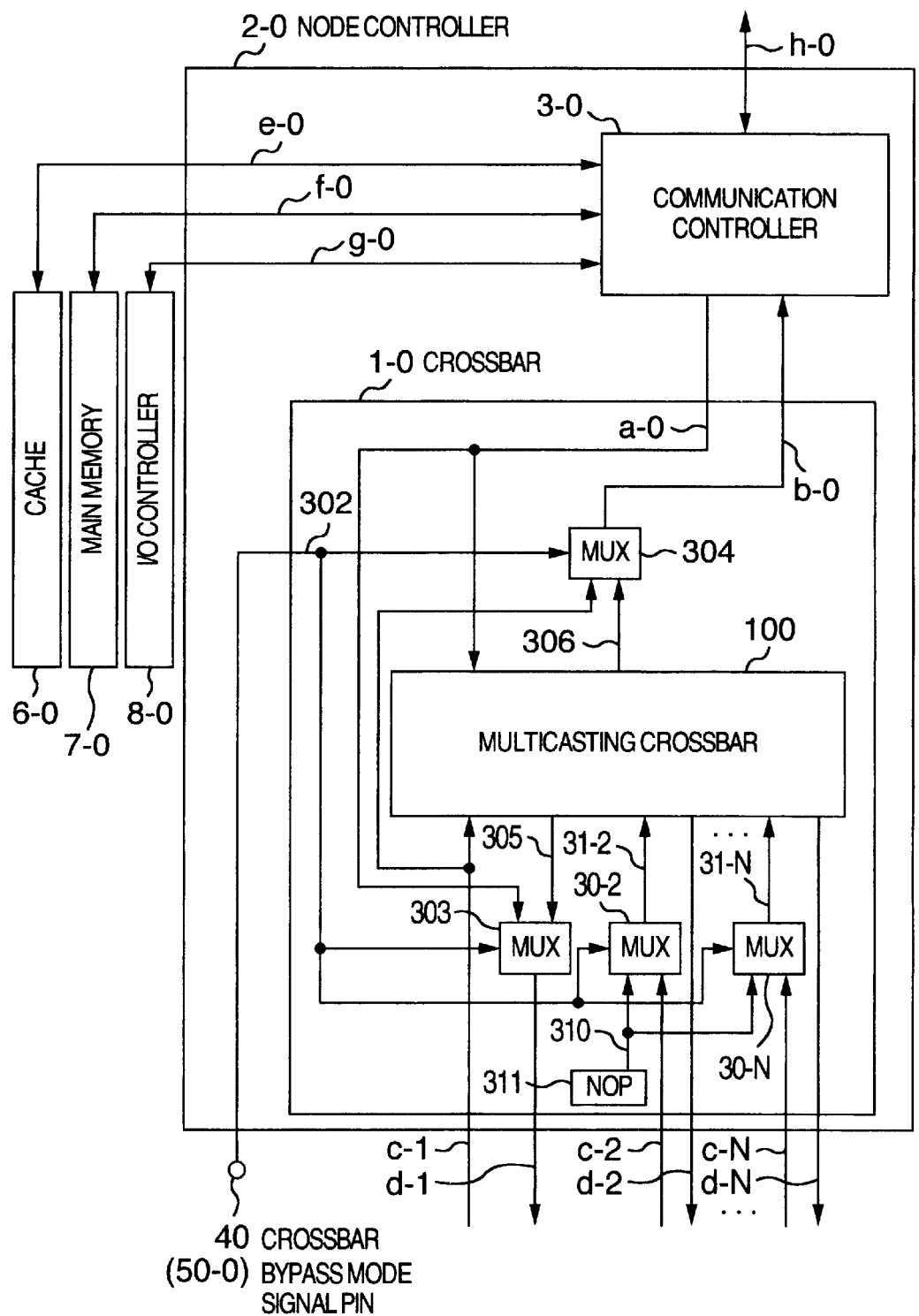
FIG. 4 shows a modification of the characteristic of FIG. 3.

It is also possible that, as shown in FIG. 4, the crossbar bypass flag register 300 is replaced by a mode signal pin or terminal 40 (crossbar bypass mode signal pin or terminal) as the crossbar controller 50-0, and the board is wired with the signal pin previously set at 0 or 1. Alternately, a jumper switch (not shown) may be provided in place of the register 300 and an output of the jumper switch may be manually set previously at 0 or 1.

Functional Description of Multicasting Crossbar

The multicasting crossbar has a function of sequencing a memory access request for cache coherency control as explained in U.S. Pat. No. 6,011,791.

It is generally known that a crossbar can perform data parallel transfer as its feature.

However, the memory access sequence may sometimes be partially reversed and a cache coherency cannot be ensured.

A bus snooping scheme is well known as a cache coherency control system. In the bus snooping scheme, in order that a plurality of CPUs connected to a CPU bus issue a memory access request to the CPU bus, a bus controller has a function of arbitrating a bus access authority.

Since the order of the memory access request determined by the bus arbitration is unique in the entire system, that is, for any CPU, cache consistency is kept.

By providing such a function of determining the order of the memory access request to a crossbar, the multicasting crossbar performs the cache coherency control.

System Operation

Explanation will now be made as to how an memory access request issued from a CPU is broadcast to the CPUs and main memory of all the nodes.

In the subsequent description, data transferred by a processor bus, crossbar, etc. such as a memory access request or a response thereto will be referred to as a transaction.

For example, it is assumed that there was no desired data in a cache memory built in the CPU 4-0-1 in FIG. 1 and a cache miss took place.

In this case, the CPU 4-0-1 issues a transaction to the processor bus h-0 to make access to data on an address having had the cache miss.

The transaction includes information about the transaction such as memory read, control information such as the number of the CPU which issued the transaction, and a requesting address (not shown).

The transaction transferred onto the processor bus h-0 is transmitted to the cache 6-0 through the communication controller 3-0 within the node controller 2-0.

If address data requested by the transaction is not held in the cache 6-0, then the transaction is tried to be sent to all the nodes to examine whether or not desired data is cached in another node.

In this case, the transaction is transmitted to the crossbar 1-0 via the communication controller 3-0.

In this exemplary operation, the crossbar bypass flag register 300 in the node 5-0 having the CPU 4-0-1 therein has a set value of 0 and thus the crossbar is made valid.

In the other all nodes 5-i ($1 \leq i \leq N$), on the other hand, the crossbar bypass flag register 300 has a set value of 1 and the crossbar is made invalid.

The transaction inputted into the crossbar is transmitted to the multicasting crossbar 100 through the signal line a-0.

Figure 5:
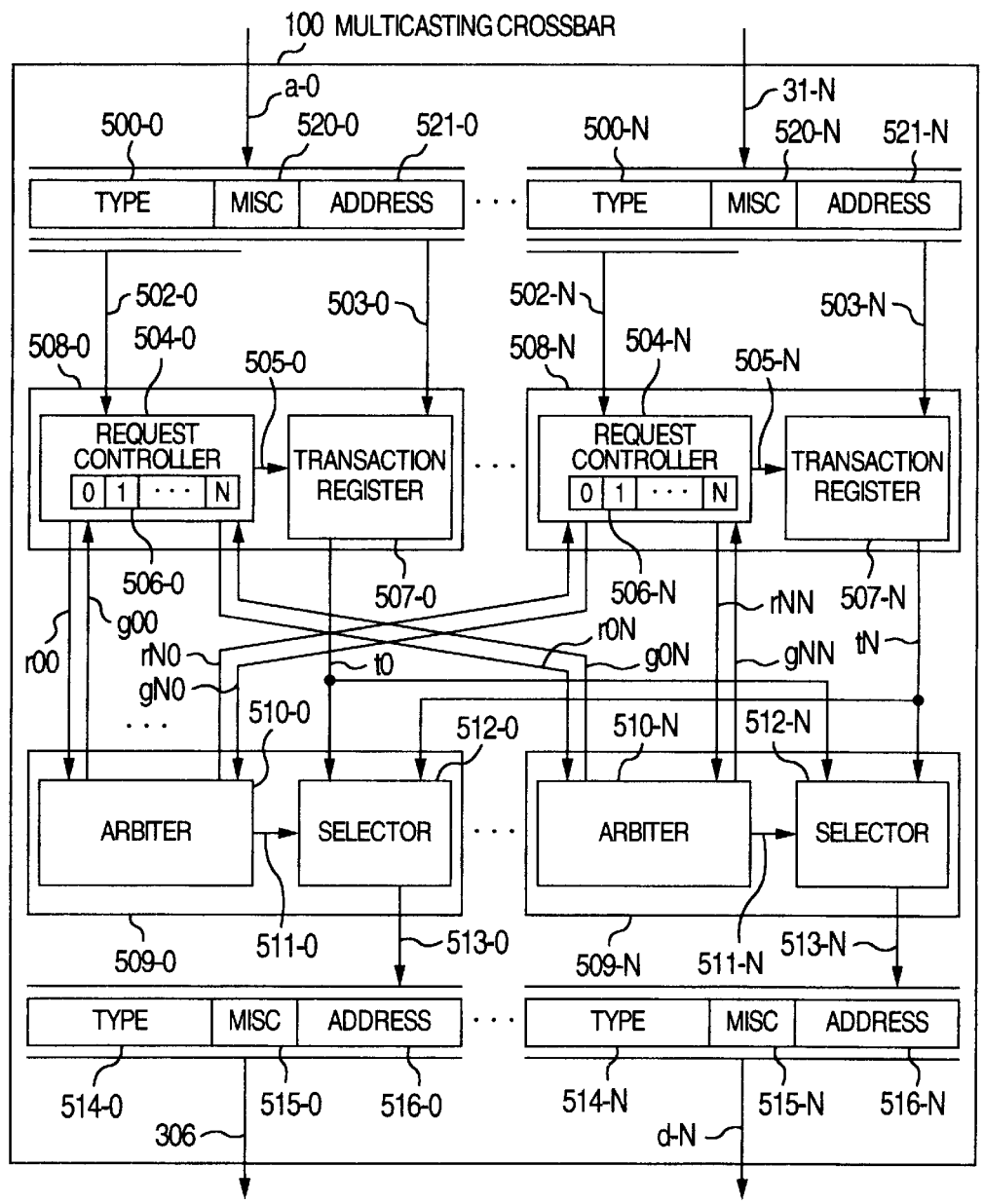
FIG. 5 shows an exemplary structure of a multicasting crossbar in the first embodiment.

FIG. 5 shows an exemplary structure of the multicasting crossbar 100 shown in FIG. 3.

The input signal lines a-0, c-1, 31-2, . . . , and 31-N are connected to input registers 500-x ($0 \leq x \leq N$), 520-x and 521-x.

However, all the signals are not illustrated and only the signals a-0 and 31-N are illustrated as typical ones in FIG. 5.

The TYPE register 500-x stores therein information indicative of the types of transactions such as the memory access request to be transferred to the crossbar and response thereof.

A MISC register 520-x stores therein transaction control information indicative of the type of a transaction such as the location of the node from which the transaction was issued.

An ADDRESS register 521-x stores therein information about the requesting address.

Further, the entire transaction is stored in a transaction register 507-0 through a signal line 503-0, and transferred to a selector 512-x via a signal line t0, waiting for arbitration completion.

Data of a TYPE register 500-0 indicative of the type of the transaction is transferred to a request controller 504-0 through a signal line 502-0.

An arbitration request signal is written in an element of a register 506-0 corresponding to the node to be transferred.

In this case, since a node having a cache or a main memory becomes a transfer destination, all the nodes are to be transferred.

Arbitration request signals r00, . . . , and r0N are transmitted from the register 506-0 to arbiters 510-0, . . . , and 510-N.

When all the arbiters perform the same arbitrating operation at the same time, no erroneous sequencing will be carried out.

For some reason, however, there may occur such a case that the arbitration request is not set for output registers 514-x, 515-x and 516-x and the respective arbiters perform their arbitrating operation with different times. Even in such a case, since all the arbiters perform their arbitrating operation in the same priority order, cache coherency will not be collapsed so long as transactions are output all in the same order.

When arbitration was settled in an arbiter 510-x ($0 \leq x \leq N$), an arbitration completion signal g0x is transmitted to a request controller 504-x.

Information indicative of the fact that the transaction from which node was settled, is transmitted through a signal line 511-x to the selector 512-x.

It is now assumed that the arbitration request signal r00 was selected by the arbiter 510-x.

The arbiter 510-x sends the arbitration completion signal g0x to the request controller 504-0 and at the same time, informs a selector 512-0 of the fact via a signal line 511-0.

The selector 512-x selects the node which settled the arbitration and transmits the transaction to the output registers 514-x, 515-x and 516-x through the signal lines t0 and 513-x.

The request controller 504-x, after receiving the arbitration completion signal g0x, resets the register 506-0 having received the arbitration request signal and at the same time, instructs the transaction register 507-0 to delete it.

The register 506-0 having an arbitration request command stored therein and the transaction register 505-0 are reset to wait for an next input.

The transaction of the output register is transmitted to the respective nodes through the signal lines 306, . . . , and d-N in FIG. 5 (more precisely, through the signal lines 306, 305, d-2, . . . , and d-N in FIG. 3).

In FIG. 1, the transaction after the arbitration is passed from the crossbar 1-0 through the signal line b-0 and also through the communication controller, transmitted to the cache 6-0 and processor bus h-0 to search for their cache tags.

In the nodes 5-1, . . . , and 5-N, the input transaction is bypassed through the crossbar and input to the communication controller and similarly, transmitted to the caches 6-1, . . . , and 6-N and processor buses h-1, . . . , and h-N to search for their cache tags.

Each node, after having examined its cache state, reports its examination result to the transaction issuance originator (which may be implemented by providing a private line or by using the crossbar used in the transfer of the memory access request, though not shown), and data is transmitted from its main memory or cache memory to the transaction issuance originator, thus completing the memory access request.

This data transmitting means may be realized by using a crossbar together or by preparing another data-exclusive interconnection network.

Explanation will next be made as to a large multiprocessor system using a multiplicity of nodes having such a structure as mentioned above. In such a large multiprocessor system as shown in FIG. 2, the nodes 5-0 to 5-N are not connected each other directly by signal lines but are connected to the external crossbar 20. More concretely, the crossbar 1-i of the node 5-i is connected to the external crossbar 20 through the signal lines c-i and d-i. Further, the external crossbar 20 has an interface 21 which applies a flag set value of 1 or a signal level of 1 to the crossbar controller 50-j in the node controller 2-i of the node 5-i via signal lines 22-i (22-0 to 22-N) to invalidate the multicasting crossbars 100 within all the nodes.

Accordingly, in such a large multiprocessor system as shown in FIG. 2, nodes used in a small multiprocessor system and a plurality of nodes having the same structure as the former nodes are connected to the external crossbar which determines a processing sequence of memory access requests issued from all the nodes.

Figure 6:
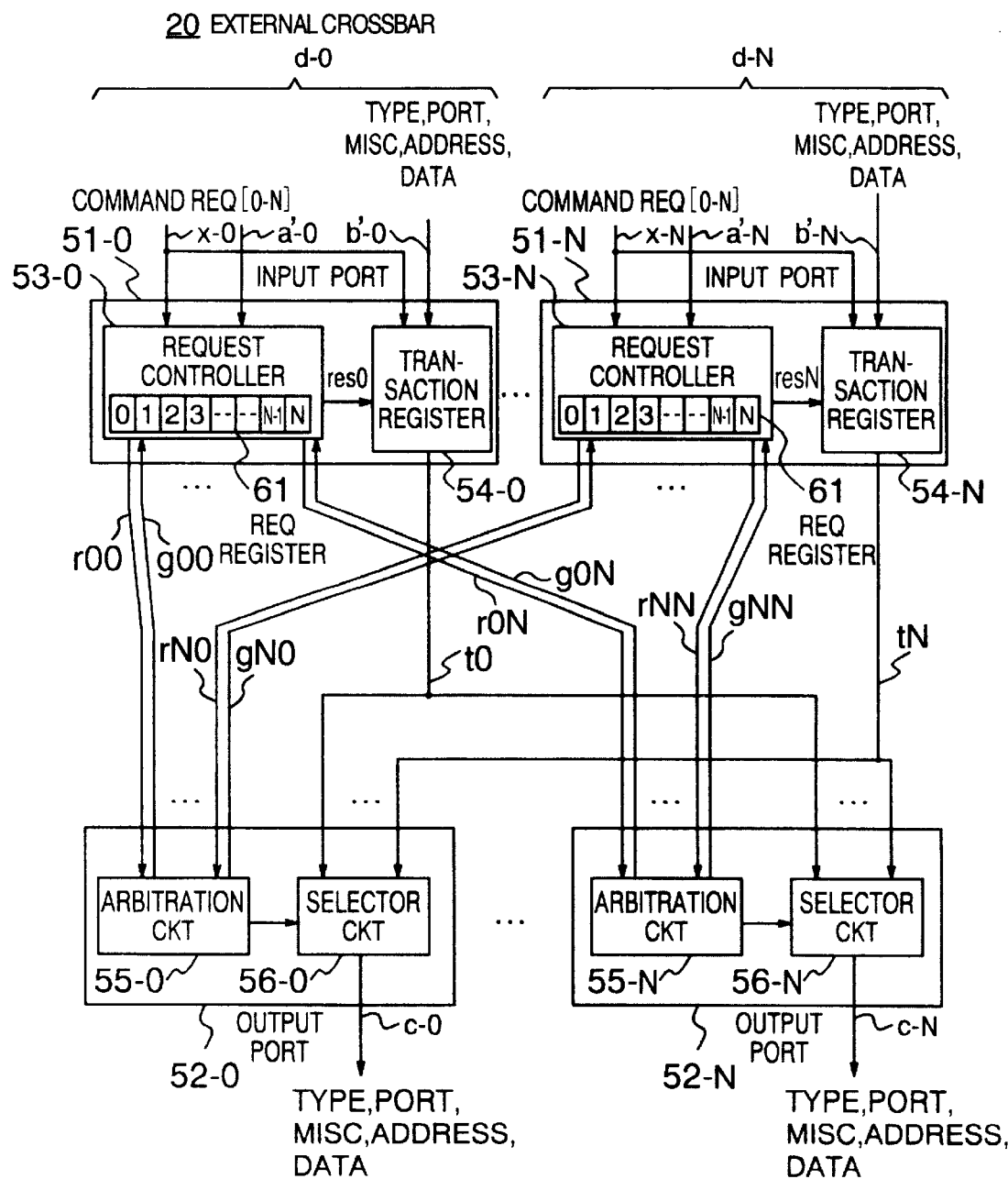
FIG. 6 shows an exemplary structure of a major part of the external crossbar.

The arrangement of the external crossbar 20 except for the interface 21 is disclosed in FIG. 6 and the description associated therewith of the aforementioned U.S. Pat. No. 6,011,791, and the operation and function of the external crossbar 20 except for the interface 21 are also disclosed therein. The disclosures of U.S. Pat. No. 6,011,791 is incorporated herein by reference.

Figure 9:
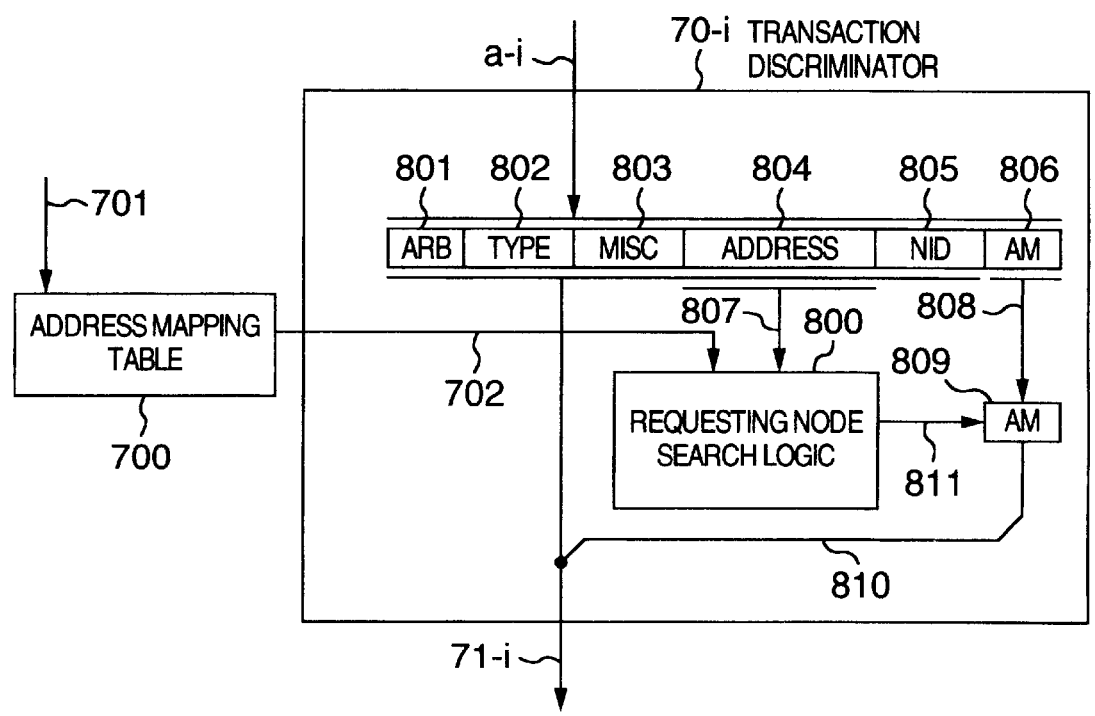
FIG. 9 shows an exemplary structure of a transaction discriminator in the second embodiment.

FIG. 6 shows a structure of the external crossbar 20 which is shown in FIG. 9 of the above U.S. Pat. No. 6,011,791 and which can be applied to the present invention. In FIG. 6, the interface 21 is removed.

FIG. 6 shows the internal structure of the external crossbar 20. For simplicity, only a part of the constituent elements of the external crossbar 20 is illustrated in FIG. 6. The external crossbar 20 has input ports 51-0 to 51-N and output ports 52-0 to 52-N, as illustrated. In FIG. 6, sets of the input and output ports having the same numbers were denoted by ports 0 to N. The input ports 51-0 to 51-N, which have request controllers 53-0 to 53-N respectively, receive transfer request signals REQ[0-N] via lines a'-0 to a'-N respectively. The request controllers 53-0 to 53-N have all an identical internal structure. Further, the input ports 51-0 to 51-N have transaction registers 54-0 to 54-N which receive and hold therein transactions from lines b'-0 to b'-N respectively. The request controller 53-0 and transaction register 54-0, for example, in each input port are arranged to receive a command signal via a line x-0, and a REQ register 61 and a transaction register 54-0 are arranged to receive the transfer request signal REQ[0-N] and transactions respectively. The output ports 52-0 to 52-N have arbiters 55-0 to 55-N and selectors 56-0 to 56-N respectively. Output signals of the selectors 56-0 to 56-N are connected to lines c-0 to c-N respectively.

In the illustrated example, inputs to the signal lines d-i in FIG. 2 correspond to the command and transfer request signals REQ[0-N], TYPE, PORT, MISC and ADDRESS as inputs on signal lines in FIG. 6. Further, the memory access request is transactions of the REQ[0-N], TYPE, PORT, MISC and ADDRESS. Furthermore, TYPE in the present application corresponds to REQ[0-N], TYPE and PORT in FIG. 6 of the above U.S. Pat. No. 6,011,791.

In FIG. 6, DATA denotes data to be transmitted from the main memory or the cache memory. Thus, the external crossbar 20 is used for transmitting both a request transaction and data. In place of such an arrangement, an external crossbar exclusively used for the request transaction and another interconnection means used for data transmission may be employed.

Second Embodiment
Brief Explanation of System Arrangement

Figure 7:
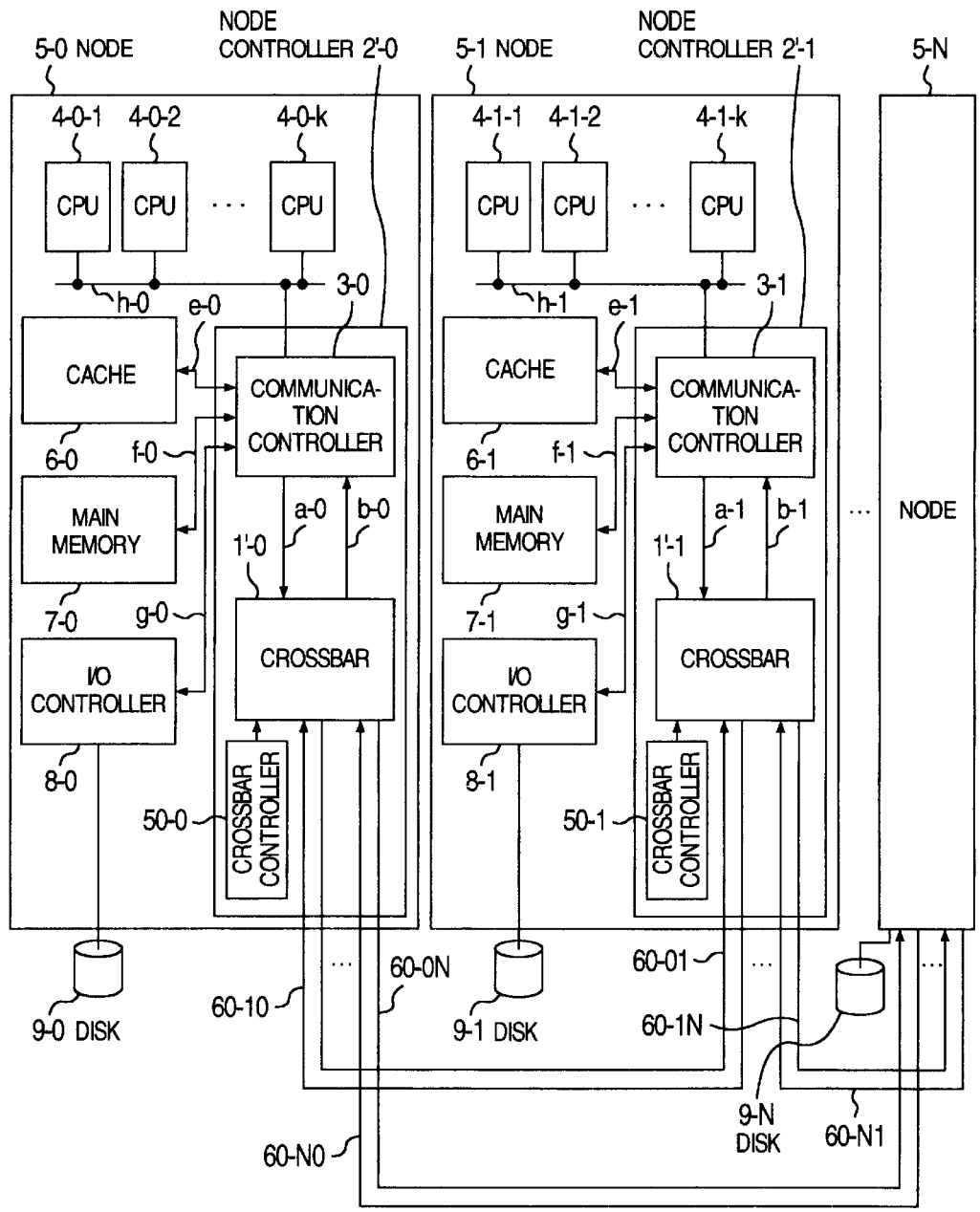
FIG. 7 schematically shows an exemplary arrangement of a multiprocessor system of a main memory shared type in accordance with a second embodiment of the present invention.

FIG. 7 shows a block diagram of an exemplary entire arrangement of a multiprocessor system of a main memory shared type in accordance with a second embodiment of the present invention.

In the second embodiment, a crossbar in each node includes:

means (700 and 70-i in FIG. 8) for judging that a memory access request issued from at least one of a plurality of nodes is to be directed to a main memory of which one of a plurality of nodes;

a means (100) for determining a processing sequence of the memory access request judged by the judging means as to be directed to the main memory of its own node having the crossbar therein; and a means (100) for transferring the memory access request judged by the judging means as to be directed to the main memory of one of the nodes other than the own node only to the one node, a crossbar controller means (50-i) in each of the plurality of nodes is arranged to make valid its own multicasting crossbar belonging to the node.

A basic arrangement of the second embodiment shown in FIG. 7 is substantially the same as the first embodiment, and the arrangement of each node is merely partially different from that of the node in the first embodiment. Thus explanation will be made as to only a part of the arrangement of the second embodiment different from the first embodiment.

In the present embodiment, nodes 5-i ($0 \leq i \leq N$) are connected to the other all nodes by signal lines 60-ij ($0 \leq j \leq N$).

The nodes 5-i have all an identical structure.

A crossbar 1'-i in each node is connected to a communication controller 3-i in its own node by signal lines a-i and b-i, and is connected to the other all nodes by signal lines 60-ij.

Explanation will be made as to the structure of a node controller 2'-i in each node by referring to FIG. 8. Since the structures of the node controllers 2'-i are all the same, explanation will be made as to only as to a node controller 2'-i an example.

In the present embodiment, each node controller 2'-i has an address mapping table 700 and a transaction discriminator 70-i as means for judging that a memory access request issued from at least one of a plurality of nodes is to be directed to a main memory within any of the plurality of nodes.

The address mapping table 700 is a correspondence table showing a relationship between addresses in a main memory space and nodes to main memories of which the addresses are allocated.

The address mapping table 700, which is located in the main memory space as a memory mapped register, sets the addresses of the memory space allocated to the nodes when the system is started.

As another method, address information to be stored in the address mapping table are defined by using a jumper switch or the like on a node.

The node controller 2'-0 has the communication controller 3-0, crossbar 1'-0, address mapping table 700, and crossbar bypass flag register 710, as already explained above.

The crossbar 1'-0 has a multicasting crossbar 100', a transaction discriminator 70-0 and multiplexers 704 and 705.

The crossbar bypass flag register 710 has substantially the same function as that shown in FIG. 3 of the first embodiment. When the set value of the crossbar bypass flag register 710 in FIG. 8 is set at, e.g., 1, the signal lines a-0 and b-0 wired between the communication controller 3-0 and multicasting crossbar 100' are connected directly with I/O signals 60-01 and 60-10 of the node.

When the set value of the crossbar bypass flag register is set at, e.g., 0, the signal line a-0 of the communication controller 3-0 carries an input signal to the transaction discriminator 70-0, and the signal line b-0 carries an output signal from the multicasting crossbar 100'.

The crossbar bypass flag registers are set at 0 in all the nodes in the case of a small system having nodes directly connected each other; whereas the registers are set at 1 in the case of a large system having all nodes connected by the external crossbar 20 as in the example of FIG. 2.

In this connection, the crossbar bypass flag register 710 is connected to the communication controller 3-0 by a signal line 711 to be set as a memory mapped register at the time of starting the system as in the first embodiment.

Or in place of the crossbar bypass flag register, a mode signal pin (not shown) may be provided as in the first embodiment.

The transaction discriminator 70-0 receives a signal from the signal line a-0 of the communication controller 3-0 and a signal from a signal line 702 of the address mapping table 700, and outputs a signal onto a signal line 71-0 connected with the multicasting crossbar 100'.

The multicasting function of the multicasting crossbar 100' is substantially the same as that in the first embodiment.

Figure 8:
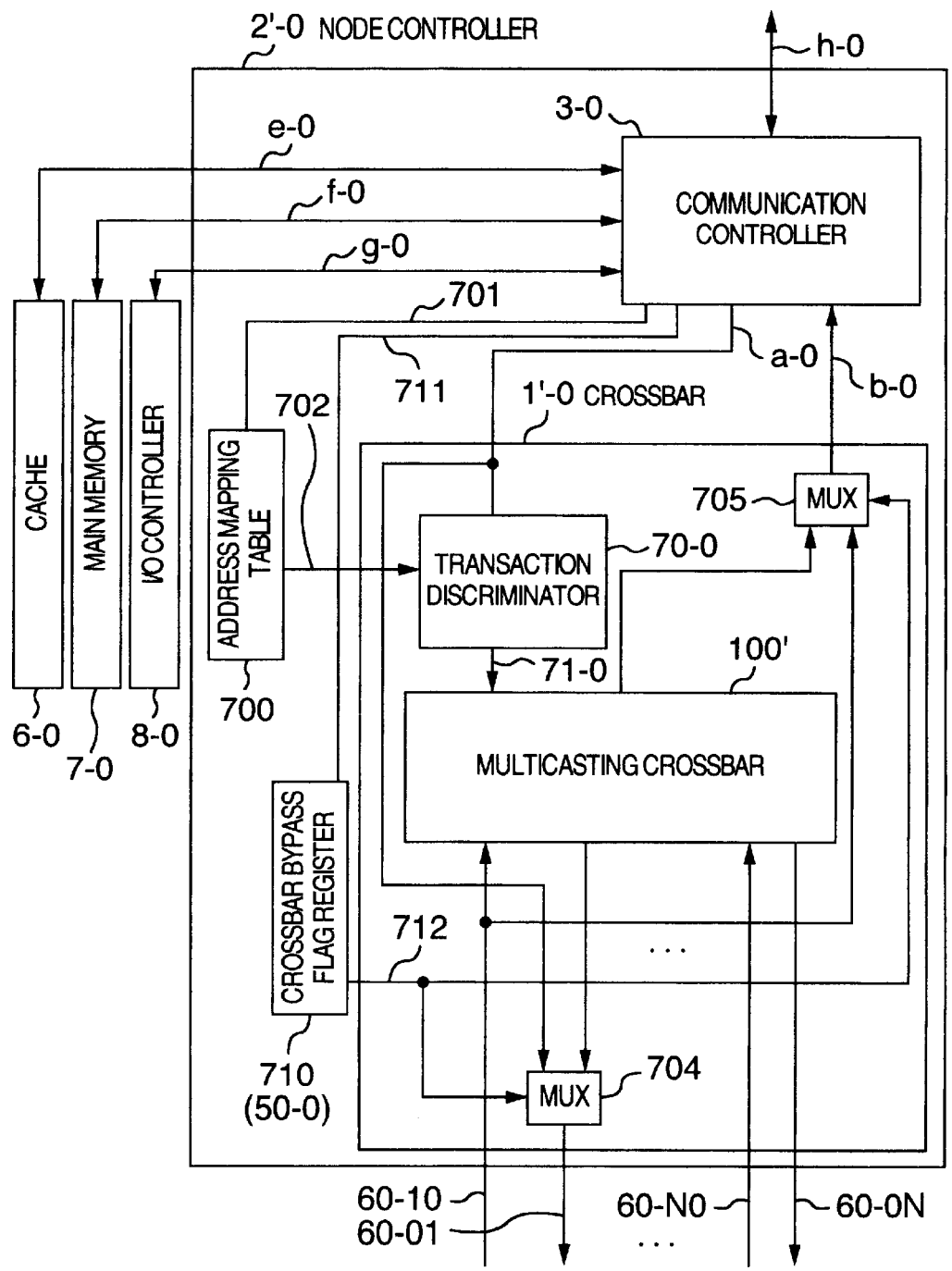
FIG. 8 shows an exemplary structure of a node controller in the second embodiment.

The multicasting crossbar 100' within the crossbar 1'-0 in FIG. 8 operates based on a table shown in FIG. 13.

Figure 10:
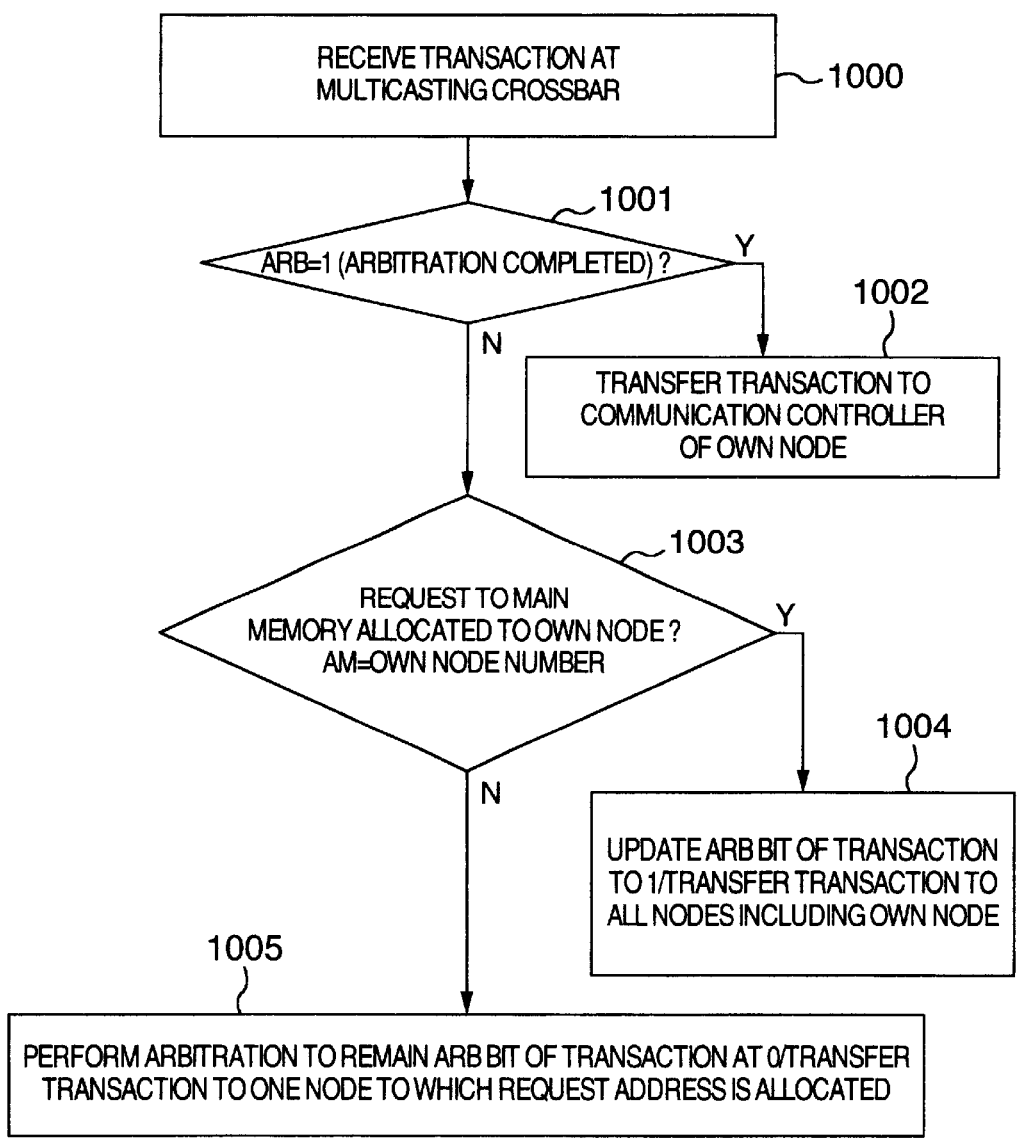
FIG. 10 is a flowchart explaining a part of exemplary request control operations of a multicasting crossbar in the second embodiment.

The operation based on FIG. 13 is shown in FIG. 10 in the form of a flowchart.

In FIG. 9, a transaction discriminator 70-i has input registers 801, 802, 803, 804, 805 and 806, and a requesting node search logic 800.

The input registers 801, 802, 803, 804, 805 and 806 are connected to a signal line a-i.

The requesting node search logic 800 is connected as its inputs to the input register 804 by a signal line 807 and also connected to the address mapping table 700 by the signal line 702.

The contents of an AM register 809 is changed with an output signal of the requesting node search logic 800.

Stored in the AM register is a node number.

The node number indicates the node to the main memory of which an address requested by the transaction is allocated.

System Operation

Explanation will now be made as to how a transaction for an memory access request issued from a CPU is broadcast to the CPUs and main memories of all the nodes as in the first embodiment.

The present embodiment will be explained in connection with access to data on the main memories or to caches of all the nodes.

In the present embodiment, explanation will be made as to a case where a transaction issuance originator for a memory access request accesses an address allocated to the main memory of its own node and as to a case where the originator accesses addresses allocated to the main memories of the other nodes.

Explanation will first be made in connection with the case where access is made to an address allocated to the main memory of its own node as an operational example (1).

It is assumed that desired data was not present in a cache memory built in the CPU 4-0-1 in FIG. 7 and a cache miss took place.

In this case, the CPU 4-0-1 issues a transaction to the processor bus h-0 to access the data at the address involving the cache miss.

The transaction includes information on the type of the transaction such as memory read-out, control information such as the number of the CPU having issued the transaction, and a requesting address.

The transaction transferred to the processor bus h-0 is sent to the cache 6-0 through the communication controller 3-0 within the node controller 2'-0.

When the data of the address requested by the transaction is not held in the cache in question, the system tries to send the transaction to all the nodes to examine whether or not the desired data is cached.

In this case, the transaction is transmitted to the crossbar 1'-0 from the communication controller 3-0 via the signal line a-0.

The transaction transmitted to the crossbar 1'-0 is sent to the transaction discriminator 70-i (70-0 in this case) in FIG. 9.

The transaction is first stored in the input registers 801, 802, 803, 804, 805 and 806.

A TYPE register 802 stores therein information indicative of the type of the transaction.

A MISC register 803 stores therein control information such as the ID number of the transaction.

An ADDRESS register 804 stores therein an address to be accessed by the transaction, and an NID register 813 stores therein information indicative of the number of the node which issued the transaction.

Further, an AM register 806 stores therein the node to the main memory of which the transaction is allocated, or the node number thereof.

An ARB register 801, which is a one-bit register, stores therein 1 when the arbitration of the transaction is already completed in the multicasting crossbar 100', and 0 when the arbitration is not completed yet.

In this case, since the arbitration in the crossbar is not carried out yet, ARB=0.

Since an object to be accessed is a memory space set in its own node, the requesting node search logic 800 writes '0' indicative of its own node number in the AM register.

However, it is assumed in the present embodiment that i in the node 5-i ($0 \leq i \leq N$) in FIG. 7 denotes an NID.

Figure 11:
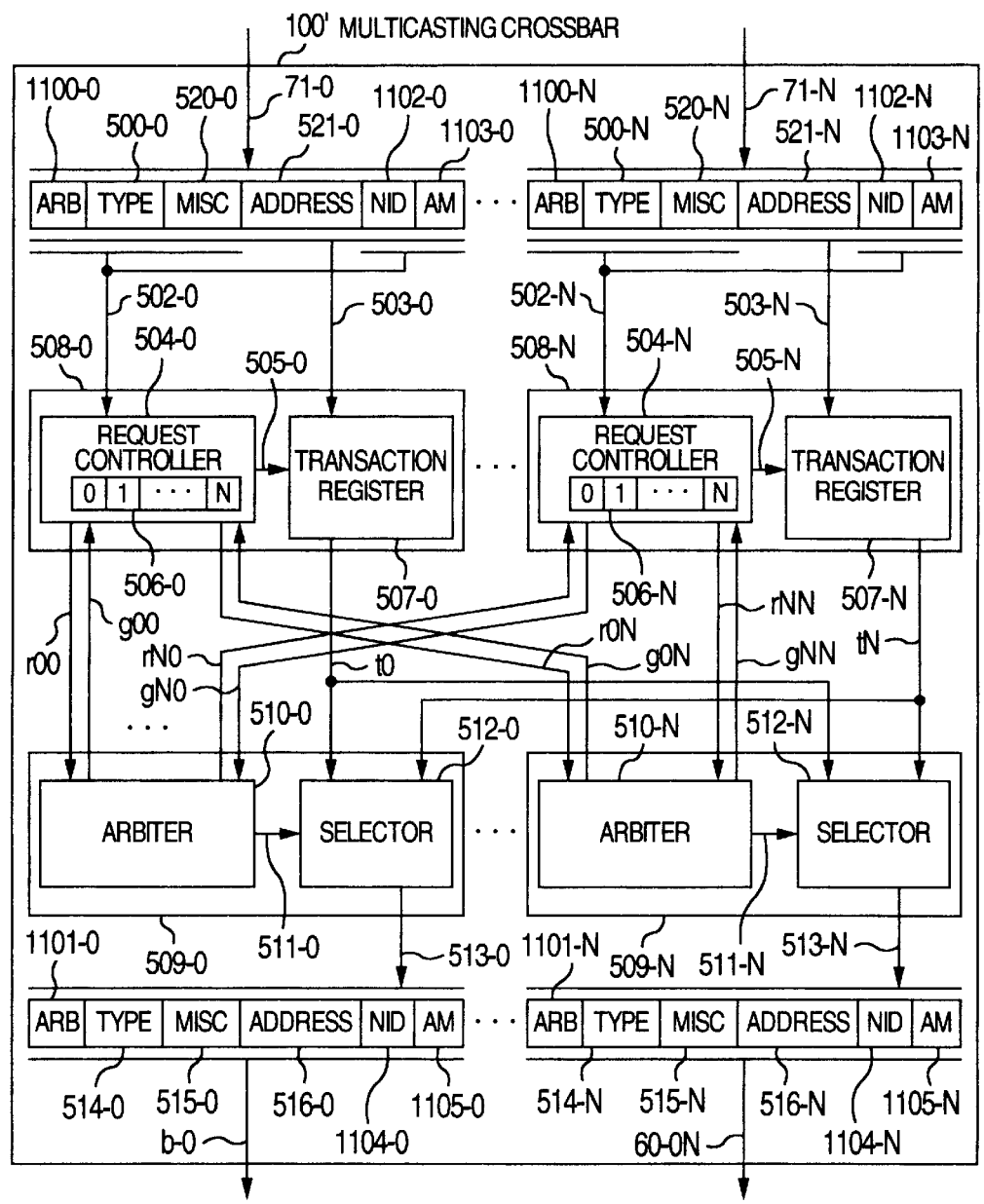
FIG. 11 shows an exemplary structure of the multicasting crossbar in the second embodiment.

The transaction inputted to the multicasting crossbar 100' in FIG. 11 is stored in the TYPE register 500-0, MISC register 520-0, ADDRESS register 521-0, ARB register 1100-0, NID register 1102-0 and AM register 1103-0 as input registers.

The registers 1100-0, 500-0, 520-0, 1102-0 and 1103-0 send their outputs to the request controller 504-0 as a command signal to set an arbitration request signal in the register 506-0 having the node number as a transmission target.

Further, the entire transaction is sent to the transaction register 507-0 via the signal line 503-0 and stored therein.

Judgement shown in the flowchart of FIG. 10 is carried out in the request controller 504-0 ($0 \leq i \leq N$).

In this case, since ARB=0 and AM=0, the condition of a step 1001 in FIG. 10 is not satisfied and the condition of a step 1003 is satisfied, so that a step 1004 is carried out.

In the step 1004, ARB is set to be equal to 1 by request controller 504-0 via a signal line 505-0 and the register 506-0 sets arbitration requests for all the nodes having the cache memories.

When arbitration requests r00, . . . , and r0N transmitted from the request controller 504-0 to an arbiter 510-i and arbitration is settled in the arbiter, the arbiter sends the number (0 in this case) of the arbitration-settled node to selector 512-0, and the selector sets the transaction received from the signal line t0 in output registers 1101i, 514-i, 515-i, 516-i, 1004-i and 1105-i to cause the transaction to be transmitted to the associated nodes.

The transaction is transmitted to the other nodes through signal lines 60-0i ($1 \leq i \leq N$).

The transaction is transmitted to the communication controller 3-0 of its own node via the signal line b-0.

Explanation will be made as to the case where the transaction arrived at the other nodes. Although explanation will be made in connection with the node 5-0 in FIG. 7 for simplicity, the same holds true even for the other nodes 5-2 to 5-N.

The transaction is transferred to the node 5-1 via a signal line 60-01 of the node 5-0 in FIG. 7.

The transaction is transferred to the multicasting crossbar 100' in FIG. 12 via the signal line 60-01.

The multicasting crossbar 100' performs the operation of a step 1002, since ARB=1 according to the flowchart of FIG. 10 and thus the condition of the step 1001 is satisfied.

The operation of the multicasting crossbar 100' is substantially the same as the foregoing explanation, but an arbitration request is set only in one of the registers of the request controller 504-1 of FIG. 11 associated with the own node.

In the subsequent operations, the arbitrating operation is carried out in the similar way to above and the transaction is transferred to a communication controller 3-1 via a signal line b-1 in FIG. 12.

In this way, the transaction is broadcast to the communication controllers of all the nodes.

The operation after the broadcast is substantially the same as the operational example of the first embodiment.

Explanation will next be made in connection with a case where access is made to the address allocated to the main memory of another node as an operational example (2).

It is now assumed that access is made to the main memory allocated to the node 5-1 in FIG. 7.

The operation until transaction issued from the CPU 4-0-1 in FIG. 7 causes a cache miss and is transferred to the crossbar 1'-0, is substantially the same as the operational example (1).

After the transaction is transferred to the crossbar 1'-0 in FIG. 7, the request controller 504-0 of the multicasting crossbar 100' in FIG. 11 performs the illustrated operation.

In the operational example, since ARB=0 and AM=1, the conditions of the steps 1001 and 1003 are not satisfied and the step 1005 is executed.

In a step 1005, since the transaction is transmitted only to one node shown by the AM register 1103-0, an arbitration request is set only in the node shown by the AM register in the register 506-0 in FIG. 11.

After the arbitration, the transaction is sent to the node 5-1 in FIG. 7.

In this way the transaction is broadcast to only one node shown by the AM register 1103-0, that is, is partially broadcast thereto.

The multicasting crossbar built in the node in question performs the step 1004, because the condition of the step 1001 in FIG. 10 is not satisfied and the condition of the step 1003 is satisfied.

The subsequent operation is substantially the same as the operational example (1).

Explanation will next be made as to a third embodiment. In the present embodiment, the structure of each node is substantially the same as that in the second embodiment of FIG. 7, but the function and operation thereof are different therefrom, which will be explained below.

In the present embodiment, a crossbar in each node includes:

means (700 and 70-1 in FIG. 12) for judging whether or not a memory access request issued from at least one of a plurality of nodes is to be directed to a main memory of its own node having the crossbar therein;

a means (100) for determining a processing sequence of the memory access request judged by the judging means as to be directed to the main memory of its own node having the crossbar therein; and a means for transferring the memory access request judged by the judging means as not to be directed to the main memory of the own node to all the nodes other than the own node having the crossbar therein, a crossbar controller means in each of the plurality of nodes is arranged to make valid its own multicasting crossbar belonging to its own node.

Figure 14:
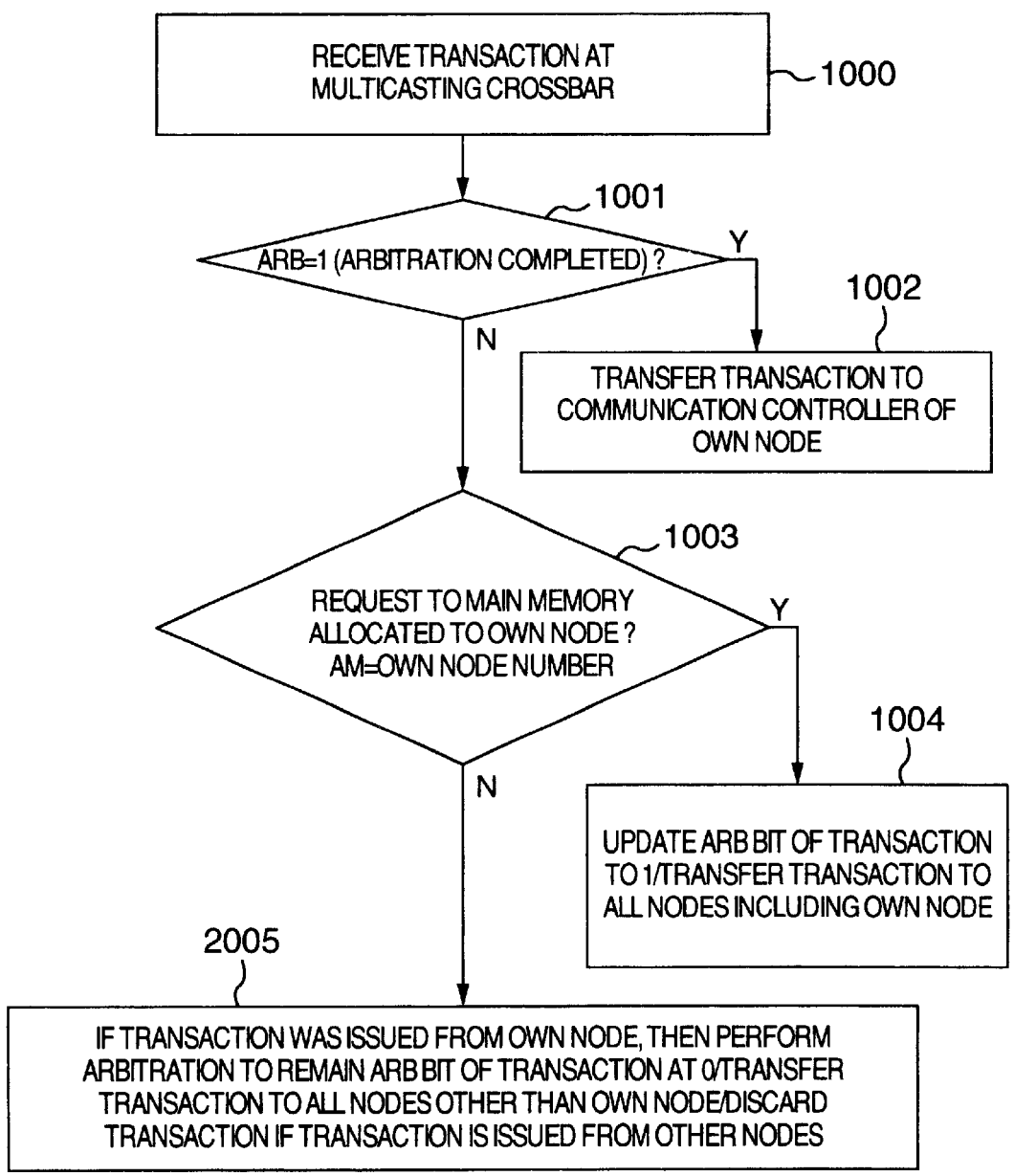
FIG. 14 is a flowchart explaining a part of request control operations of a multicasting crossbar in a third embodiment.

That is, in accordance with the present embodiment, in order to realize such operation, the operation of the step 1005 of the flowchart of FIG. 10 is changed to a step 2005 in a flowchart of FIG. 14.

In FIG. 14, in a step 1004, as in the step 1004 in FIG. 10, when a request (transaction) is judged to be directed to the main memory allocated to its own node in a step 1003, the ARB bit of the transaction is updated and at the same time, the transaction is transferred to the own node having the cache therein and to the other all nodes having the caches therein.

Further, when the request (transaction) is judged in the step 1003 not to be directed to the main memory allocated to the own node and when the request was issued from the own node, arbitration is carried out, the ARB bit of the transaction remains 0 without being changed, and the transaction is transferred to all the nodes other than the own node in the step 2005. Meanwhile, when the request was issued not from the own node but from another node, the request is discarded.

FIG. 15 is a table for explaining the request controlling operation of the present embodiment corresponding to FIG. 13.

Explanation will then be made as to a large multiprocessor system having such an arrangement as shown in the second and third embodiment and using a multiplicity of nodes. In this case, like FIG. 2, nodes 5-0 to 5-N are not directly connected each other by signal lines but connected by intervention of an external crossbar 20. More specifically, signal lines c-i and d-i connected to a crossbar 1-i of each node 5-j are connected to the external crossbar 20. Further, the external crossbar 20 has an interface 21 which in turn is connected to a crossbar controller 50-i within a node controller 2-i of each node 5-i via a signal line 22-i (22-0 to 22-N) to give a flag set value of 1 or signal level of 1, thus making invalid the multicasting crossbars 100 in all the nodes.

The foregoing embodiments have been explained in connection with the case where the present invention is applied to the multiprocessor system arranged so that each node includes the CPUs having the caches therein, the main memory, the node controller, and the I/O controller. However, the present invention is not limited to the arrangement of a multiprocessor system to which the present invention is to be applied. For example, the present invention may be applied also to a multiprocessor system which is arranged so that each node includes at least at least one or more of the CPU, main memory and I/O controller, in addition to a node controller.

In accordance with the present invention, a small multiprocessor system can be arranged by mounting a crossbar in each node and connecting these nodes directly.

In addition, since such nodes can be utilized even in a large system, its development costs can be reduced.

In accordance with the present invention, further, since cache coherency control is realized without using directory and with use of the crossbar, a communication cost for directory search can be reduced and thus memory latency can be reduced.

When it is desired to increase the main memory, no use of directory enables elimination of the need for adding resources other than the main memory, thus enabling scale-up of the system with low costs.

What is claimed is:

1. A multiprocessor system of a main memory shared type having a plurality of nodes mutually connected to each other by signal lines, each of said plurality of nodes comprising:

a CPU having a cache memory;

a main memory; and a node controller for performing communication control between said CPU, main memory and the other nodes in said plurality of nodes, said node controller having:

a communication controller for controlling communication interface to said other nodes;

a crossbar, provided between said communication controller and said signal lines, for determining a processing sequence of ones of memory access requests to the main memories in said plurality of nodes issued from at least one of said plurality of nodes, and for multicasting a memory access request obtained from said signal line or said communication controller to all or fewer than all of said other nodes if the memory access request is needed to be multicasted for cache coherency control; and a bypass controller means for validating or invalidating said crossbar and forming, when said crossbar is to be invalidated, a first bypass line leading memory access requests on said signal line to said communication controller and a second bypass line leading memory access requests directed to said other nodes from said communication controller to said signal line.

2. A multiprocessor system of a main memory shared type as set forth in claim 1, wherein said bypass controller means in one of said plurality of nodes validates the crossbar of said one node, and the bypass controller means of the other remaining nodes than said one node invalidate the associated crossbars of the remaining nodes, whereby the crossbar of said one node determines the processing sequence of memory access requests to the main memories within said plurality of nodes.

3. A multiprocessor system of a main memory shared type as set forth in claim 1, wherein said bypass controller means is a mode register for validating or invalidating the associated crossbar or crossbars according to a value set therein.

4. A multiprocessor system of a main memory shared type as set forth in claim 1, wherein said bypass controller means is a mode signal input terminal for validating or invalidating the associated crossbar or crossbars according to a signal value inputted thereto.

5. A multiprocessor system of a main memory shared type having a plurality of nodes connected to each other by signal lines, each of said plurality of nodes comprising:

a CPU having a cache memory;

a main memory; and a node controller for performing communication control between said CPU, main memory and the other nodes in said plurality of nodes, said node controller having:

a communication controller for controlling communication interface to said other nodes;

a crossbar, provided between said communication controller and said signal line, for determining a processing sequence of ones of memory access requests issued from at least one of said plurality of nodes to the main memories of said plurality of nodes which are to be directed to the main memory within its own node having said node controller therein, and for multicasting a memory access request obtained from said signal line or said communication controller to all or fewer than all of said other nodes if the memory access request is needed to be multicasted for cache coherency control; and a bypass controller means for validating or invalidating said crossbar and forming, when said crossbar is to be invalidated, a first bypass line leading memory access requests on said signal line to said communication controller.

6. A multiprocessor system of a main memory shared type as set forth in claim 5, wherein said crossbar has:

means for judging whether or not the memory access request issued from at least one of said plurality of nodes is to be directed to the main memory in any of said plurality of nodes;

means for determining a processing sequence of said memory access request judged by said judging means to be directed to the main memory within its own node having said crossbar therein; and means for transferring the memory access request judged by said judging means to be directed to the main memory of one of the other nodes of said plurality of nodes than said own node only to only said other one node, wherein said bypass controller means in each of said plurality of nodes validates the crossbar in its own node.

7. A multiprocessor system of a main memory shared type as set forth in claim 5, wherein said crossbar has:

means for judging whether or not the memory access request issued from at least one of said plurality of nodes is to be directed to the main memory in its own one of said plurality of nodes having said crossbar therein;

means for determining a processing sequence of said memory access request judged by said judging means to be directed to the main memory within said own node; and means for transferring the memory access request judged by said judging means not to be directed to the main memory of the own node to all the nodes other than said own node, wherein said bypass controller means in each of said plurality of nodes validates the crossbar in its own node.

8. A multiprocessor system of a main memory shared type as set forth in claim 5, wherein said bypass controller means is a mode register for validating or invalidating the associated crossbar or crossbars according to a value set therein.

9. A multiprocessor system of a main memory shared type as set forth in claim 5, wherein said bypass controller means is a mode signal input terminal for validating or invalidating the associated crossbar or crossbars according to a signal value inputted thereto.

10. A multiprocessor system of a main memory shared type having a plurality of nodes connected to each other by signal lines, each of said plurality of nodes comprising:

a CPU having a cache memory;

a main memory; and a node controller for performing a communication control between said CPU, main memory and the other nodes in said plurality of nodes, said node controller having:

a communication controller for controlling communication interface to said other nodes;

a crossbar, provided between said communication controller and said signal lines, for determining a processing sequence of ones of memory access requests issued from at least one of said plurality of nodes to the main memories of said plurality of nodes which are to be directed to the main memory at least within its own node having said node controller therein; and a bypass controller means for validating or invalidating said crossbar, said multiprocessor system further comprising an external crossbar which is connected to said plurality of nodes for determining a processing sequence of memory access requests issued from at least one of said plurality of nodes to be directed to the main memories in said plurality of nodes.

11. A multiprocessor system of a main memory shared type as set forth in claim 10, wherein said external crossbar has an interface, said interface causing said crossbar controller means within said plurality of nodes to invalidate said crossbars of said plurality of nodes.

12. A multiprocessor system of a main memory shared type as set forth in claim 10, wherein said bypass controller means is a mode register for validating or invalidating the associated crossbar or crossbars according to a value set therein.

13. A multiprocessor system of a main memory shared type as set forth in claim 10, wherein said bypass controller means is a mode signal input terminal for validating or invalidating the associated crossbar or crossbars according to a signal value inputted thereto.

14. A node controller comprising:
a crossbar for determining a processing sequence of ones of memory access requests issued from its own node having said node controller therein and from at least one other node of a plurality of other nodes which are to be directed to the main memory within at least said own node; and
bypass controller means for validating or invalidating said crossbar and forming, when said crossbar is to be invalidated, a bypass line leading memory access requests on a signal line bypassing said crossbar to a communication controller.

15. A node controller as set forth in claim 14, wherein said crossbar determines a processing sequence of memory access requests issued from said at least one other node to be directed to the main memories of said own node and said other nodes.

16. A node controller as set forth in claim 14, wherein said crossbar has:
means for judging whether or not the memory access request issued from said at least one other node is to be directed to the main memory of any of said own and other nodes;
means for determining a processing sequence of memory access requests judged as to be directed to the main memory of the own node having said crossbar therein; and
means for transferring the memory access request judged as to be directed to the main memory of one of the other nodes than said own node in said plurality of nodes, only to the other nodes.

17. A node controller as set forth in claim 14, wherein said crossbar has:
means for judging whether the memory access request issued from at least one other node is to be directed to the main memory of said own node or to the main memories of the other nodes;
means for determining a processing sequence of memory access requests judged as to be directed to the main memory of said own node having said crossbar therein; and
means for transferring the memory access requests judged as to be directed to the main memories of the other nodes, to all said other nodes.

18. A node controller as set forth in claim 14, wherein said means for validating or invalidating the crossbar is a mode register for validating or invalidating the crossbar according to a value set therein.

19. A node controller as set forth in claim 14, wherein said means for validating or invalidating the crossbar is a mode signal input terminal for validating or invalidating the crossbar according to a signal value inputted thereto.

20. A node controller as set forth in claim 14, wherein said node controller is adapted to be connected to an external crossbar, said external crossbar having a crossbar which is connected to said own node and the other nodes for determining a processing sequence of ones of memory access requests issued from at least one of said own and other nodes to be directed to the main memories of said own and other nodes, such that said node controller is made invalid by said external crossbar.

* * * * *